United States Patent [19]
Sachs

[11] Patent Number: 5,287,633
[45] Date of Patent: Feb. 22, 1994

[54] COFFEE ROASTING PROCESS AND APPARATUS

[76] Inventor: Kerry Sachs, 1462 Tanforan Way, Woodland, Calif. 95695

[21] Appl. No.: 963,186

[22] Filed: Oct. 19, 1992

[51] Int. Cl.$^5$ .............................................. F26B 3/00
[52] U.S. Cl. ........................................ 34/13; 34/135; 34/33; 426/466; 99/483
[58] Field of Search ................. 34/141, 142, 136, 137, 34/135, 126, 127, 33, 13; 426/466; 99/483

[56] References Cited
U.S. PATENT DOCUMENTS 2,288,085  6/1942  Gea ..................................... 34/142 X
2,452,134  10/1948  Lowe ................................... 34/127

Primary Examiner—Henry A. Bennet
Attorney, Agent, or Firm—Glen R. Grunewald

[57] ABSTRACT

A coffee roaster in the form of a rotating drum having internal baffles forming oppositely-pitched helical paths that drive tumbling coffee beans toward the center of the drum in one direction of rotation of the drum and toward the ends of the drum in the other direction of rotation of the drum, the rotating drum being contained within a vessel and providing with a source of gas in the space between drum, the gas being hot enough to effect roasting of coffee beans.

3 Claims, 1 Drawing Sheet

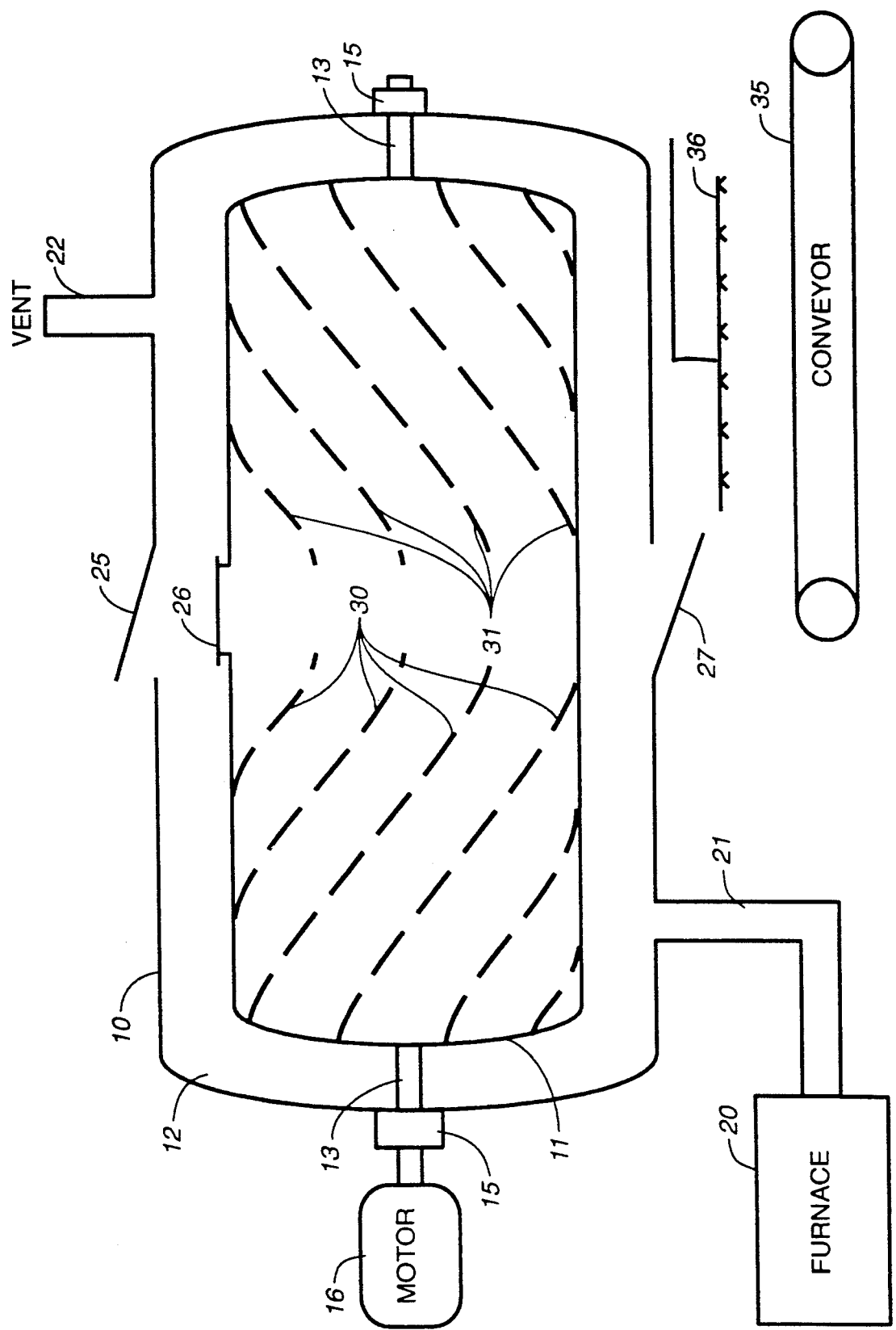

COFFEE ROASTING PROCESS AND APPARATUS

TECHNICAL FIELD

This invention is in the field of roasting green coffee beans to produce roasted beans useful for brewing coffee.

BACKGROUND ART

Coffee beans are harvested in a form called green beans and are not useful for brewing coffee until they are roasted. Green beans are roasted by subjecting them to heat at a temperature, and for a time, to produce physical and chemical changes. The physical changes mostly involve driving off water and volatile organic compounds. Chemical changes involve limited pyrolysis which chars or carbonizes the organic compounds in the beans, and the pyrolysis creates more volatile materials, which are driven off, and slightly carbonized residues. The taste of coffee depends to a large extent on the character and quality of the green beans, but it is strongly influenced by the roasting process. Human taste is a very discriminating sense that is capable of distinguishing small differences in taste resulting from small differences in the roasting procedure. These small differences frequently make the difference between good coffee and bad coffee.

Green coffee beans are conventionally roasted by radiation caused by direct exposure to flame in a roasting oven. The beans are maintained in a rotating drum and tumbled as they are exposed to flame and hot gas. This process creates three major problems. One problem is that each bean is not subjected to the same roasting conditions as each other bean because they occupy different positions along the axis of the roasting oven. A second problem is that the window of opportunity to stop the roasting process when the maximum benefit from roasting has been achieved is very small. The roasting process does not stop abruptly when the flame is turned off. The residual heat in the beans causes the roasting process to continue until they are removed from the oven and cooled. The higher the temperature of the beans the more critical it is to stop roasting at exactly the right moment. Finally, the flame and hot gas used in conventional roasting cause deposits of undesirable combustion residue on the roasted beans.

DISCLOSURE OF THE INVENTION

This invention is a process and an apparatus for roasting green coffee beans which overcomes or greatly mitigates the above noted problems. The apparatus of this invention includes a stationary outer vessel and a rotating inner drum positioned within, and spaced from, the walls of the outer vessel. The inner drum has an inlet for green coffee beans and an outlet for roasted coffee beans. The same port may be used both as an inlet and as an outlet. The outer drum includes an inlet for introducing hot gas into the space between the inner drum and the outer vessel and it also includes an exhaust vent for gas. The apparatus also includes means for rotating the inner drum reversibly on its long axis at a speed that will cause coffee beans within the drum to tumble.

The inner drum has interior baffles set to form helical paths with respect to the axis of rotation of the drum. The baffles are set to form some helical paths to drive tumbling beans in on axial direction and other helical paths to drive the beans in the other axial direction. Preferably, the baffles are in two sets - one set extending from the center of the drum in one direction and the other set extending from the center of the drum in the opposite direction. When the drum is rotated in one direction, the baffles within the drum drive beans from the center of the drum towards both ends; and when the direction of rotation is reversed, the baffles drive the beans from the ends of the drum toward the center.

The device of this invention causes tumbling beans to be heated only by contact with the hot drum wall so that roasting proceeds at a slower pace than when the beans are exposed to direct flame. Tumbling of the beans causes each bean to have substantially the same exposure as each other bean to contact with a hot drum wall. The helical paths formed by the baffles cause each bean to be exposed to the same drum wall areas as each other bean, moving alternately from the center of the drum toward both ends and then from the ends of the drum toward the center. Roasting by contact with a hot drum wall causes the process to proceed more slowly and provides a greater time period to determine when the roasting process is complete and to stop the roasting process by removing beans from the drum and cooling them.

BRIEF DESCRIPTION OF THE DRAWINGS

The drawing is a schematic of an apparatus embodying this invention.

BEST MODE FOR CARRYING OUT THE INVENTION

The embodiment illustrated in the drawing includes an outer vessel 10 surrounding an inner drum 11 wherein a space 12 is formed between the walls of the outer vessel 10 and the drum 11. The drum 11 is suspended within the interior of vessel 10 by axles 13 which are supported on bearings 15. One axle is connected to a motor 16—which may or may not be provided with a transmission—in order to cause the drum 11 to rotate on axles 13. The motor 16 is a reversible motor or, alternatively, it is a motor provided with a transmission that can cause the direction of rotation of drum 11 to be reversed.

A furnace 20 of an appropriate design is provided to produce a flow of hot gas through duct 21. The hot gas is introduced into the space 12 between vessel 10 and drum 11 and it is vented from that space through vent 22.

In the illustrated embodiment a hatch 25 is positioned in the top of vessel 10 at approximately the center of the end-to-end dimension of vessel 10. Drum 11 is provided with a bean-loading inlet 26 that is also covered with a hatch, and inlet 26 is located immediately beneath the opening covered by hatch 25. The drum 11 may be rotated so that the position of bean inlet 26 is immediately below hatch 25. Vessel 10 is also provided with an unloading hatch 27 which is in alignment with hatch 25 and bean inlet 26.

The interior of drum 11 is provided with two sets of baffles arranged to form helical paths. The baffles may be short baffles appropriately aligned or long baffles in the form of helixes. The baffles 30 form helical flow paths from the left side of drum 11 to its central region while the baffles 31 form oppositely configured helical flow paths from the right side of drum 11 toward its center portion.

Finally, the conveyor 35 and the quenching spray-arrangement 36 are provided beneath unloading hatch 27 for conveying and cooking the roasted beans, with or without quenching.

To perform the roasting process motor 16 is operated to position the bean inlet 26 immediately below loading hatch 25. At that point loading hatch 25 and bean inlet 26 are both opened and green beans are introduced into the interior of drum 11 through the two aligned openings. When a batch of green beans is within drum 11, both the inlet 26 and the hatch 25 are closed. The bean-unloading hatch 27 is also closed. Furnace 20 is then put into operation and hot exhaust gas from furnace 20 passes through duct 21 and enters the space 12 between the vessel 10 and drum 11. The hot gas flows through the space 12 and heats the walls of drum 11 before passing from space 12 through vent 22. While hot gas is passing through space 12 the motor 16 is operated so that drum 11 rotates at a speed that causes tumbling of the green beans within it. Rotation in one direction will cause the beans to tumble against the hot wall and the baffles 30 and 31 and be driven toward the center of drum 11 and away from its ends. Periodically the motor 16 is reversed so the direction of the rotation of drum 11 is likewise reversed and the beans then tumble against the hot wall and against baffles 30 and 31 and are driven toward the center of drum 11. Accordingly, the beans are in tumbling contact with the hot walls of drum 11 moving alternately from the ends of the drum 11 toward the center and from the center of drum 11 toward the end, depending upon the direction of rotation of the drum. This tumbling and axial motion of the beans causes each bean to be treated substantially identically with each other bean with respect to the length of time the bean is in contact with the hot drum wall and the position within the drum that such contact occurs, as well as the equalization of temperatures among the beans by contact with each other. Heating the beans by contact with the hot drum wall provides a slower roasting process so that each stage of the roasting process is sustained for a longer time period than when beans are roasted by the direct flame process. In this way the time for terminating the roasting process is much less critical, and reproducible roasting results from one batch of beans to the next is much easier to achieve.

When the roasting process is complete or nearing completion, with a predictable completion time remaining due to the heat capacity of the beans, the rotation of drum 11 is stopped with the bean inlet 26 pointing up. Opening hatch 25 provides access to open bean inlet 26. Hatch 27 is also opened and drum 11 is then rotated through 180 so that the roasted beans in drum 11 fall through inlet 26 and discharge through hatch 27. Beans falling through hatch 27 are carried on conveyor 35 and, if desired, quenched sufficiently to terminate the roasting process by lowering the temperature of the bean sufficiently to stop pyrolysis.

The final portion of the roasting process is accomplished with motor 16 turning drum 11 in a direction to drive beans from both ends of drum 11 toward the center until baffles 30 and 31 drive all beans toward the opening 26 to be discharged from the drum.

I claim:
1. A coffee roasting device comprising
   a stationary outer vessel;
   a single rotatable inner drum having a gas impervious wall positioned within and spaced from said outer vessel to form a hot gas space;
   an inlet through said outer vessel to pass hot gas into said hot gas space, and an outlet through said outer vessel to remove gas from said hot gas space;
   a closable green coffee bean inlet into said inner drum;
   first internal baffles forming a helical path adjacent a first axial length of a rotating wall of said inner drum, said helical path pitched to drive particulate material in said drum in a first axial direction upon rotation of said drum;
   second internal baffles forming a helical path adjacent a second axial length of rotating wall of said inner drum, said second baffles pitched to drive particulate material in an axial direction opposite said first axial direction upon rotation of said drum; and
   means to reversibly rotate said inner drum whereby green coffee beans tumbled within a driven alternately toward the ends of said inner drum and toward the center of said inner drum and in contact with said rotating wall.

2. The process for roasting green coffee beans comprising
   a) introducing said green coffee beans into the inner drum of a coffee roasting device having a stationary outer vessel; a single rotatable inner drum having a gas-impervious wall positioned within and space from said outer vessel to form a hot gas space; an inlet to said outer vessel to pass hot gas into said hot gas space, and an outlet to said outer vessel to remove gas from said hot gas space; a closable green coffee bean inlet into said inner drum; first internal baffles forming a helical path adjacent a first axial length of a rotating wall of said inner drum, said helical path pitched to drive particulate material in said drums in a said first axial direction upon rotation of said drum; second internal baffles forming a helical path adjacent a second axial length of rotating wall of said inner drum, said second baffles pitched to drive particulate material in an axial direction opposite said first axial direction upon rotation of said drum; and means to reversibly rotate said inner drum;
   b) introducing hot gas into said hot gas space;
   c) rotating said inner drum in a direction to drive said beans in a first axial direction away from the center and toward the ends of said inner drum for a time sufficient to increase the number of beans at the ends of said inner drum and to deplete the number of beans in the center of said inner drum;
   d) reversing the direction of rotation of said inner drum to drive said beams in a second axial direction away from the ends and toward the center of said inner drum for a time sufficient to increase the number of beans at the center of said inner drum and to deplete the number of beans at the ends of said inner drum;
   e) repeatedly reversing the direction of rotation of said inner drum for a time sufficient to roast coffee beans;
   f) rotating said inner drum in a direction to drive said roasted coffee beans toward a coffee-bean outlet; and
   g) removing said roasted coffee beans from said inner drum.

3. The process of claim 2 wherein said removed roasted beans are quenched.

* * * * *